(12) United States Patent
Emanuel et al.

(10) Patent No.: US 9,712,381 B1
(45) Date of Patent: Jul. 18, 2017

(54) SYSTEMS AND METHODS FOR TARGETED PROBING TO PINPOINT FAILURES IN LARGE SCALE NETWORKS

(71) Applicant: Google Inc., Mountain View, CA (US)

(72) Inventors: Dotan Emanuel, Herzeliya (IL); Dan Raz, Timrat (IL); Eran Liberty, Or-Yehuda (IL); Aleksandr Smirnov, Dublin (IE)

(73) Assignee: Google Inc., Mountain View, CA (US)

( * ) Notice: Subject to any disclaimer, the term of this patent is extended or adjusted under 35 U.S.C. 154(b) by 227 days.

(21) Appl. No.: 14/590,571

(22) Filed: Jan. 6, 2015

Related U.S. Application Data

(60) Provisional application No. 62/031,760, filed on Jul. 31, 2014.

(51) Int. Cl.
*H04L 12/24* (2006.01)
*H04L 12/26* (2006.01)

(52) U.S. Cl.
CPC ...... *H04L 41/0677* (2013.01); *H04L 43/0829* (2013.01); *H04L 43/50* (2013.01)

(58) Field of Classification Search
None
See application file for complete search history.

(56) References Cited

U.S. PATENT DOCUMENTS

| | | | | |
|---|---|---|---|---|
| 5,563,875 A | * | 10/1996 | Hefel | H04L 12/2697 370/248 |
| 5,917,831 A | * | 6/1999 | Katker | H04L 12/2697 709/237 |
| 7,194,661 B1 | * | 3/2007 | Payson | H04L 12/2697 370/242 |
| 7,933,214 B2 | | 4/2011 | Stjernholm et al. | |
| 7,983,175 B2 | | 7/2011 | Gale et al. | |
| 7,995,491 B1 | * | 8/2011 | Bhangley | H04L 41/0622 370/216 |
| 2003/0204619 A1 | * | 10/2003 | Bays | H04L 12/2697 709/238 |
| 2009/0180393 A1 | | 7/2009 | Nakamura | |

(Continued)

OTHER PUBLICATIONS

Katz-Bassett, E., et al., Reverse Traceroute, E. USENIX Symposium on Networked Systems Design & Implementation (NSDI), 16 pages, 2010. Available at: http://www.cs.washington.edu/homes/ethan/papers/reverse_traceroute-nsdi10.pdf.

*Primary Examiner* — Kodzovi Acolatse
(74) *Attorney, Agent, or Firm* — McDermott Will & Emery LLP

(57) ABSTRACT

Systems and methods for locating network errors. The system includes a plurality of host nodes in a network of host nodes and intermediary nodes, and a database storing route data for each of a plurality of host node pairs. The system includes a controller configured to identify a subject intermediary node to investigate for network errors and select, using route data stored in the database, a set of target probe paths. Each target probe path includes a respective pair of host nodes separated by a network path including at least one target intermediary node, which is either the subject intermediary node or an intermediary node that is a next-hop neighbor of the subject intermediary node. The controller is configured to test each target probe path in the set of target probe paths and to determine, based on a result of the testing, an operational status of the subject intermediary node.

24 Claims, 7 Drawing Sheets

(56) References Cited

U.S. PATENT DOCUMENTS

| | | | |
|---|---|---|---|
| 2009/0219823 A1* | 9/2009 | Qian | H04L 41/0631 370/250 |
| 2009/0222575 A1* | 9/2009 | Goodman | H04L 12/2697 709/238 |
| 2011/0058499 A1* | 3/2011 | Zhang | H04L 45/00 370/254 |
| 2014/0325279 A1* | 10/2014 | Suriyanarayanan | H04L 43/12 714/37 |

* cited by examiner

370

| Node | Interface | Ingress Paths | | | Egress Paths | | |
|---|---|---|---|---|---|---|---|
| R | R(A) | A→B | A→C | A→D | B→A | C→A | D→A |
|  | R(T) | C→A | D→A |  | A→C | A→D |  |
|  | R(K) | B→A |  |  | A→B |  |  |
| K | K(B) | B→A | B→C | B→D | A→B | C→B | D→B |
|  | K(M) | C→B | D→B |  | B→C | B→D |  |
|  | K(R) | A→B |  |  | B→A |  |  |
| T | T(R) | A→C | A→D |  | C→A | D→A |  |
|  | T(U) | C→A | D→A |  | A→C | A→D |  |
| M | M(K) | B→C | B→D |  | C→B | D→B |  |
|  | M(U) | C→B | D→B |  | B→C | B→D |  |
| U | U(C) | C→A | C→B | C→D | A→C | B→C | D→C |
|  | U(D) | D→A | D→B | D→C | A→D | B→D | C→D |
|  | U(T) | A→C | A→D |  | C→A | D→A |  |
|  | U(M) | B→C | B→D |  | C→B | D→B |  |

SYSTEMS AND METHODS FOR TARGETED PROBING TO PINPOINT FAILURES IN LARGE SCALE NETWORKS

CROSS-REFERENCE TO RELATED PATENT APPLICATIONS

This application claims the benefit of U.S. Provisional Application No. 62/031,760, filed Jul. 31, 2014, with the title of "Systems and Methods for Targeted Probing to Pinpoint Failures in Large Scale Networks."

BACKGROUND

Computer networks may include any number of routers and other devices that direct the transmission of data from one location to another. Transmission of data from one location to another involves routing the information across multiple interconnected devices in the network. A fault in a device in the network can thus have an impact on many paths that data traverses in the network and can result in failure of the transmissions. Certain faults that result in loss of data during such transmissions are referred to as silent failures or black holes. The faults causing silent failures are challenging to identify, especially in large scale networks. Because silent failures are unannounced and can only be identified by their effects on data transmission, active monitoring and identification of such faults is needed.

SUMMARY

One aspect of the disclosure is directed to a system for locating network errors. The system includes a plurality of host nodes participating in a network of host nodes and intermediary nodes, wherein each host node in the plurality of host nodes includes a respective processor executing an instance of a network monitoring agent. The system includes a database storing route-data in computer-readable memory, the route-data representing, for each of a plurality of host node pairs, a set of intermediary nodes in a respective network path between the host nodes of the respective host node pair. The system also includes a controller in communication with the plurality of host nodes. The controller is configured to identify a subject intermediary node to investigate for network errors. The controller is configured to select, using the route-data stored in the database, a set of target probe paths. Each target probe path includes a respective pair of host nodes separated by a network path that includes at least one target intermediary node that is either the subject intermediary node or an intermediary node that is a next-hop neighbor of the subject intermediary node. The controller is configured to test each target probe path in the set of target probe paths. Testing a subject target probe path includes instructing a source host node of the subject target probe path, in the set of target probe paths, to send a targeted probe to a destination host node of the subject target probe path, and determining whether the targeted probe arrived at the destination host node. The controller is configured to then determine, based on a result of the testing, an operational status of the subject intermediary node.

Another aspect of the disclosure is directed to a method of locating network errors. The method includes maintaining a database storing route-data in computer-readable memory, the route-data representing, for each of a plurality of host node pairs, a set of intermediary nodes in a respective network path between the host nodes of the respective host node pair in a network of host nodes and intermediary nodes, wherein each host node includes a respective processor executing an instance of a network monitoring agent. The method includes identifying a subject intermediary node to investigate for network errors and selecting, using route-data stored in the database, a set of target probe paths, where each target probe path includes a respective pair of host nodes separated by a network path that includes at least one target intermediary node that is either the subject intermediary node or an intermediary node that is a next-hop neighbor of the subject intermediary node. The method includes testing each target probe path in the set of target probe paths by instructing the network monitoring agent at a source host node of a subject target probe path, in the set of target probe paths, to send a targeted probe to a destination host node of the subject target probe path, and determining whether the targeted probe arrived at the destination host node. The method also includes determining, based on a result of the testing, an operational status of the subject intermediary node.

Another aspect of the disclosure is directed to computer-readable media storing instructions that, when executed by a processor, cause the processor to: maintain a database storing route-data in computer-readable memory, the route-data representing, for each of a plurality of host node pairs, a set of intermediary nodes in a respective network path between the host nodes of the respective host node pair in a network of host nodes and intermediary nodes, wherein each host node includes a respective processor executing an instance of a network monitoring agent; to identify a subject intermediary node to investigate for network errors and selecting, using route-data stored in the database, a set of target probe paths, where each target probe path includes a respective pair of host nodes separated by a network path that includes at least one target intermediary node that is either the subject intermediary node or an intermediary node that is a next-hop neighbor of the subject intermediary node; to test each target probe path in the set of target probe paths by instructing the network monitoring agent at a source host node of a subject target probe path, in the set of target probe paths, to send a targeted probe to a destination host node of the subject target probe path, and determining whether the targeted probe arrived at the destination host node; and to determine, based on a result of the testing, an operational status of the subject intermediary node.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

Following below are descriptions of various concepts related to, and implementations of, methods, apparatuses, and systems for detecting faults causing silent failures in a computer network. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
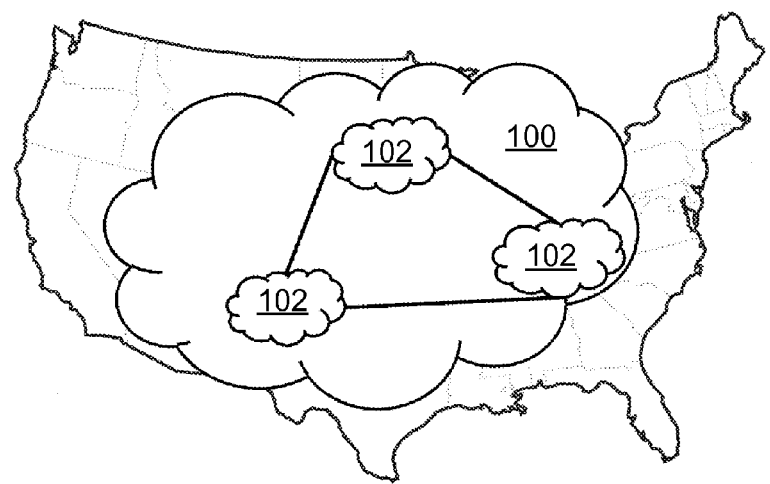
FIG. 1 is a schematic diagram of an example network, according to an illustrative implementation.
Figure 2:
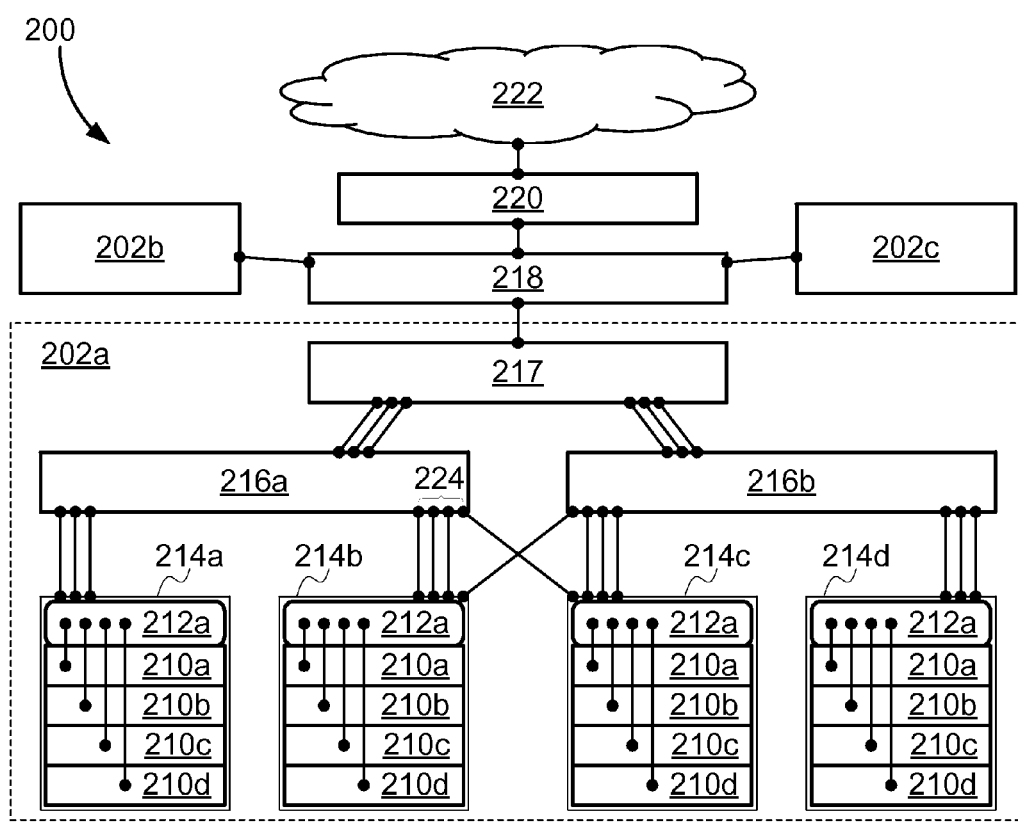
FIG. 2 is a block diagram of an example data center network, according to an illustrative implementation.

The present disclosure is directed generally to systems and methods of detecting and identifying silent failures in a network. The network includes a plurality of servers, switches, routers or other hardware components that are collectively referred to as "nodes" herein. Nodes can be faulty for any of a number of reasons, including having a faulty link, faulty configuration or faulty hardware. Nodes can be faulty, for example, at one or more of many ports (network interfaces) on the node. Nodes may also be faulty in specific situations. For example, silent failures can result from a node that is faulty in that it fails to receive or transmit a certain type of data packet or fails to receive or transmit a data packet in the context of a certain path. Nodes are not always faulty for all data packets that pass through them. A "faulty node" or "failed node" may also result from a software or configuration error, for example, a routing error or routing that leads to packet loss, where there is no element that is physically faulty. Detection of silent failures can be a major challenge as silent failures are not announced and may only be observed by active monitoring of the network. In large scale networks that include many nodes, in some cases thousands of nodes, hundreds of thousands of nodes, or even in excess of a million nodes, active monitoring can be highly demanding with regard to resources and time. A scalable fault detection system suitable for large scale networks that identifies likely faults is described herein. FIGS. 1 and 2 generally demonstrate the structure and scale associated with some large scale data networks.

FIG. 1 is a block diagram of a network 100 that includes multiple data centers 102. Each data center houses many thousands of servers connected to the network through various switches and gateway devices, described in greater detail below. Data centers may be located in different geographic areas and linked together. In some implementations data centers in the same network may be in different countries, or even different continents. Together, across the data centers, the servers, routers, switches and links between such components form a network that may include tens or hundreds of thousands, in some cases over a million nodes.

FIG. 2 is a block diagram of an example data center 200 which may be included in the network 100 shown in FIG. 1. In broad overview, a data center 200 includes several interconnected superblocks 202a-202c (also referred to as "pods"). Each superblock 202 may include hundreds or thousands, or more, servers 210 arranged in racks 214. The superblocks 202 are communicatively coupled to one another by optical and/or electrical communication links. The superblocks 202 can be connected directly, or through spineblocks 218, which serve as switches for routing data communications between the superblocks 202. The server racks 214 and servers 210 are connected to one another via a hierarchy of switches. For example, each server rack 214 includes a top-of-rack ("ToR") switch 212 for handling data communications into and out of a given server rack 214. ToR switches 212 may be connected to one or more aggregating switches 216 within a superblock. While, for illustrative purposes, the superblock 202 in the example data center 200 only depicts three layers of switches (i.e., the top-of-rack switches 212, the aggregating switches 216a and 216b and a top-tier aggregating switch 217) in the hierarchy of switches, in some implementations, a data center may include one or more additional layers of switches in its switching hierarchy. Additional layers of switches may be between the top-of-rack switches 214 and the top-tier aggregating switch 217 in a given superblock 202.

Each server rack 214 groups together, and houses, a plurality of servers 210. Each rack 214 also houses at least one ToR switch 212. Although illustrated as a single group of servers 210 per server rack 214, in practice, a server rack 214 may house multiple groups of servers 210 and a ToR switch 212 for each group.

A ToR switch 212 is an edge layer device connecting a group of servers 210 in a rack 214 to the rest of the data center 200 and to an external data network 222. Each server 210 in a rack 214 has one or more data links to its respective ToR switch 212 via one or more ports on the ToR switch 212. Each ToR switch 212 connects its respective group of servers 210 to at least one aggregating switch 216 by one or more data links to one or more ports 224 on the aggregating switch 216. For example, rack 214b houses a group of servers 210a-210d which each have one or more links to a ToR switch 212a, and the ToR switch 212a is connected to an aggregating switch 216a by one or more links. In some implementations, a ToR switch 212 is connected to multiple aggregation layer devices 216. As an example, ToR switch 212a is connected to aggregating switch 216a as well as aggregating switch 216b.

The servers 210 housed by a data center 200 are accessed externally via an external data network 222. The external data network 222 is a network facilitating interactions between computing devices. An illustrative example external data network 222 is the Internet; however, other networks may be used. The external data network 222 may be composed of multiple connected sub-networks. The external data network 222 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The external data network 222 may be any type and/or form of data network and/or communication network. The external data network 222 may be public, private, or a combination of public and private networks. The external data network 222 is used to convey information between external computing devices and the servers 210 within the data center 200. The originating source of a communication may be referred to as a source node, and the terminal destination of the communication may be referred to as a destination node, while every other node through which the communication passes may be referred to as intermediary nodes. In some contexts, the source node and the destination node may both be referred to as host nodes.

As indicated above, one or more gateway devices 220 connect the servers 210 to the external data network 222 through the described architecture culminating in the gateway devices 220. A gateway device 220 is a high bandwidth high capacity network device such as a router or a switch. In some implementations, a gateway device 220 connects to a corporate backbone or fiber, such that both sides of the gateway device 220 are under unified control. In some implementations, a gateway device 220 connects to a network service provider network, which may be provided by a third party. In some implementations, the gateway device 220 implements a firewall or filtering protocols to restrict data access to or from the data center 200.

The servers 210 in a network may interact with one another by sending and receiving data packets via the network links. The servers 210 may interact with other servers 210 in the same rack 214, on other racks 214 within the same superblock 202, within another superblock 202, or another data center 200 by sending and receiving packets via the network links. A packet may be routed through one or more ToR switches 212, aggregating switches 216, spineblocks 218, and/or network gateway devices 220 to reach its destination server. In many cases, the packets cannot be routed directly from a first superblock 202 to a second superblock 202. Instead, the packets are passed through one or more intermediate superblocks 202 as they are routed from the first superblock 202 to the second superblock 202. In FIG. 2, for example, the server 210a on the server rack 214b may interact with sever 210d, server 210h or a server located within another superblock 202 in the same data 200 center or another data center 200. For example, one possible route to server 210d for a packet being sent by server 210a would be through ToR switch 212a, aggregating switch 216a, top-tier aggregating switch 217, aggregating switch 216b, and ToR switch 212d to server 210h. Because data centers 200 may include multiple superblocks 202 and multiple aggregating layers, routes may include many steps (also referred to as "hops"). As a packet is communicated along a route, each node transmits the packet to a neighboring node, referred to generally as the next-hop node.

There can be multiple paths between any two nodes in a network. For example, a data packet being sent from server 210a to server 210h can travel multiple possible paths. One path for such a data packet is from source node, server 210a, through ToR switch 212a, aggregating switch 216b, ToR switch 212d to destination node, server 210h. Another path for the data packet with the same source and destination nodes is from source node, server 210a, through ToR switch 212a, aggregating switch 216a, aggregating switch 217, aggregating switch 216b, ToR switch 212d and then to the destination node, server 210h. In an example where the top-tier aggregating switch 217 is a faulty node and causing a silent failure, packets sent from source node, server 210a, to the destination node, server 210h via the first above described path from server 210a, through ToR switch 212a, aggregating switch 216b, and ToR switch 212d, will successfully reach the destination node, server 210h. If the packet was routed along the second above described path from the source node, server 210a, through ToR switch 212a, aggregating switch 216a, top-tier aggregating switch 217, aggregating switch 216b, ToR switch 212d and then to server 210h, the packet would fail to reach the destination.

Figure 3A:
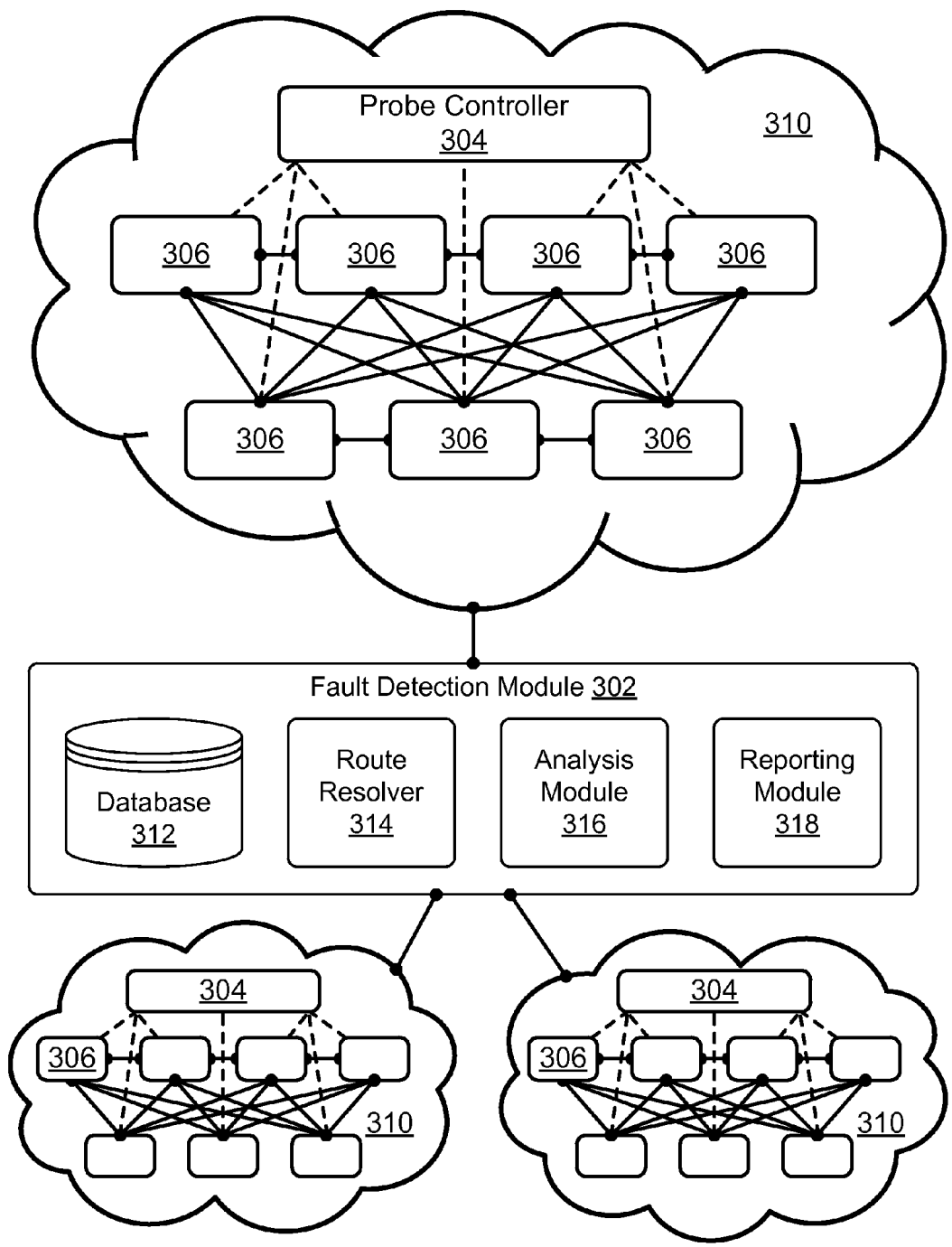
FIG. 3A is a schematic diagram of an example network equipped with a fault detection system, according to an illustrative implementation.

FIG. 3A is a block diagram of a network equipped with a fault detection system. The fault detection system includes a fault detection module 302, a plurality of zone probing controllers 304, and a plurality of nodes hosting network monitoring agents 306.

Each of the components of the fault detection system (zone probing controllers 304, network monitoring agents 306, and the fault detection module 302) described herein can be implemented as a combination of hardware and software. For example, a component can be implemented as computer readable instructions stored on a tangible computer readable medium. When the computer executable instructions are executed by a processor, the instructions cause the processor to carry out the functionality of the respective components described further below. In some implementations, a component is implemented entirely in hardware, e.g., as an application-specific integrated circuit (ASIC). In some implementations, modules described herein as distinct separate modules are implemented in a combined form. For example, in some implementations, the fault detection module 302 and the probe controller 304 are implemented on the same hardware.

In large networks, such as the one depicted in FIG. 3A, scalability of fault detection may be improved by logically dividing (or segmenting) the network into zones (or segments). For example, the network shown in FIG. 3A is divided into zones 310. Each zone 310 may include thousands, or even millions, of nodes. Each zone 310 includes nodes physically located in one or more data centers. A network may be divided into zones 310 based on physical location of the nodes, logical grouping of the nodes, or in any arbitrary manner. The number of nodes included in a zone 310 may vary. For example, a zone could include all of the nodes within a superblock, multiple superblocks, or one or more data centers. In some implementations, a network may be a single zone, with no segmenting.

Each zone 310 includes a zone probing controller 304. Each zone probing controller 304 is in communication with monitoring agents 306 in its respective zone and with a fault detection module 302. Zone probing controllers 304 generate probing instructions that include a specified source node and a specified destination node, and send each probing instruction to the monitoring agents 306 associated with the specified source node. In some implementations, instructions are sent using a network communication protocol. In some implementations, instructions are sent as a remote procedure call. Zone probing controllers 306 receive indications from the monitoring agents 306 of which probing instructions were successful and which failed. The zone probing controllers 304 transmit the information to the fault detection module 302 for further processing.

Each network monitoring agent 306 is associated with a node in a zone 310. In some implementations, each monitoring agent 306 is implemented as a standalone computing device, which participates as a node in the network. In some implementations, the monitoring agents 306 are implemented as software executing on nodes in the network, e.g., on servers 210 included in a data center, such as the data center 200 shown in FIG. 2. In some implementations, the monitoring agents 306 are implemented as software executing on routers, switches or on any other nodes participating in the network.

In general, a network monitoring agent 306 at a source node (a "source agent") receives instructions from a zone probing controller 304. The zone probing controller 304 can instruct a source agent 306 to send a probe to a particular destination. The zone probing controller 304 can instruct a source agent 306 to resolve a network path to a particular destination. In some implementations, the source agent 306 resolves a network path by performing a traceroute.

A source agent 306, in response to receiving an instruction from a zone probing controller 304 to send a probe to a particular destination, transmits a probe to the specified destination node. In some implementations, the probe is a one-way probe, wherein the monitoring agent 306 at the destination node, upon receiving the probe, transmits an indication of such to the zone probing controller 304. In some implementations, the probe is a two-way probe, wherein the destination node responds to the probe with a confirmation of receipt. If a response confirming successful receipt by the destination node of the probe is received by the source agent 306, the monitoring agent 306 transmits an indication of such to the zone probing controller 304. In some implementations, each probe may be either a one-way probe or a two-way probe, and the zone probing controller 304 specifies the type of probe in the instructions sent. When a two-way probe is used, it effectively probes both a network path from the source to the destination, and a network path from the destination back to the source. A monitoring agent 306 for a source node sending a two-way probe can determine success or failure locally and, in the event of a failure, re-send the probe if appropriate.

The probe is considered successful when the zone probing controller 304 receives confirmation that the probe was received. If a probe is not successful, the network monitoring agent 306 may transmit the probe again. In some implementations, if no response is received from the destination node, the monitoring agent 306 re-sends the probe up until a threshold number of failures has been reached. For example, in some implementations, the threshold number of failed transmissions is set between five and ten. When the threshold number of failures has been reached, the monitoring agent 306 transmits the indication of such to the zone probing controller 304. In some implementations, the monitoring agent 306 provides the indication of success or failure of a probing instruction, as a response to the remote procedure call initiating the probe transmission. In some other implementations, the monitoring agent 306 provides the indication as a separate independent communication. The functionality of the monitoring agents 306 is described further below and in relation to FIG. 5.

A source agent 306, in response to receiving an instruction from a zone probing controller 304 to resolve a network path to a particular destination, identifies a network path from the source node hosting the source agent 306 to the specified destination node. In some implementations, the source agent 306 resolves a network path by performing a traceroute. Any method of traceroute can be used. For example, in some implementations, a traceroute is performed by the source monitoring agent by sending a series of Internet Control Message Protocol (ICMP) echo requests with incremented hop limitations (time-to-live "TTL" flags set to 1, 2, 3, etc.). The source agent then processes the resulting ICMP time-out responses from progressively further next-hop intermediary nodes to construct route data for a network path towards the destination node. Some implementations of traceroute send a User Datagram Protocol (UDP) packet with an invalid port number as the data packet.

Because networks are constantly subjected to routing changes, and because traceroute typically uses a dozen or more request packets that are not guaranteed to take the same routes, traceroute is not guaranteed to reveal the same network path used by other network transmissions such as the previously described probe. However, the network path resolved by traceroute is a reasonably good estimate of a network path used by a packet from the source node to the destination node.

Traceroute generates route information for a series of intermediary nodes forming a network path from a source node to a destination node. Although routing algorithms in networks allow for path diversity, it is likely that all packets from the source node to the destination node follow the same network path. Therefore, it is likely that a probe will follow the path resolved by a contemporaneous traceroute. If the probe failed, the traceroute is likely to identify a path to a last-responsive intermediary node en route to destination node. If the returned path does not include the destination node, it is referred to herein as a "partial path." If it includes the destination node, it is referred to a successful path.

In some cases, for example, when the path from the destination to the source is different from the path from the source to the destination, the fault causing a probe instruction to fail can be located at a node on the return path from destination to source but not on the path from the source to the destination. As such, in some implementations, the route resolving function includes a "reverse traceroute" in addition to the traceroute function described above. With a reverse traceroute, the route resolver causes the destination node to execute a traceroute function back to the source. In some implementations, this reverse path can be considered and treated like any other potentially faulty path. If either the forward traceroute or the reverse traceroute yield successful paths to their destination (the probe instruction destination node in the former and the probe instruction source node in the latter), the route resolver can identify the successful path as such, removing it from the set of faulty paths. In other implementations, the paths resolved by reverse traceroute functions and traceroute functions can be combined and the nodes identified by either function can be stored in the same path. In some implementations, a partial path can include only the terminal node and/or terminal node next hopes identified by the traceroute and reverse traceroute functions.

In some implementations, a network monitoring agent 306, responsive to a successful probe, will determine a network path to associate with the probe, e.g., by performing a traceroute as described. In some implementations, the monitoring agent 306 only determines the network path for a small percentage (e.g., less than 2%, less than 1%, about 0.1%, or even fewer) of the successful probes. This is described in more detail below and in relation to FIG. 4.

Still referring to FIG. 3A, the illustrated fault detection module 302 includes a database 312, a route resolver 314, an analysis module 316, and a reporting module 318. Information indicating the success or failure of probing instructions from across the network is received by the fault detection module 302 from the zone probing controllers 304, and is stored in the database 312. Route data for network paths resolved by monitoring agents 306 is received by the fault detection module 302 and stored in the database 312. The route resolver 314 processes the route data and determines when additional route data is needed. The probe data, and associated route data, is stored in the database 312, accompanied by appropriate metadata, e.g., a time-stamp for when the data was collected. In some implementations, a database entry for a successful probe includes identifying information for the source node, identifying information for the destination node, a time stamp for when the probe was sent, a network path from the source to the destination (e.g., as discovered by a traceroute), and a time stamp for when the network path was identified.

In some implementations, the route resolver 314 of the fault detection module retrieves probing instructions associated with failed transmissions of probes and, for each retrieved probing instruction, executes a route resolving operation to at least partially resolve the paths traveled by the probes. Paths that are fully resolved and include the destination node are referred to as "successful paths" and partially resolved paths are referred to as "partial paths." The route resolver 314 stores successful and partial paths in the database included in the fault detection module.

The reporting module 318 of the fault detection module is configured to report network elements that have been identified as potentially faulty. As an example, the reporting module 318 can report the most likely faulty elements causing silent failures by displaying them to a human user. For example, the reporting module 318 can send one or more emails, alert messages, SMS messages, or other electronic messages to report the discovered faults. Alternatively the reporting module can directly display the set of nodes on a display device, e.g., as a Web page or custom reporting utility.

Figure 4:
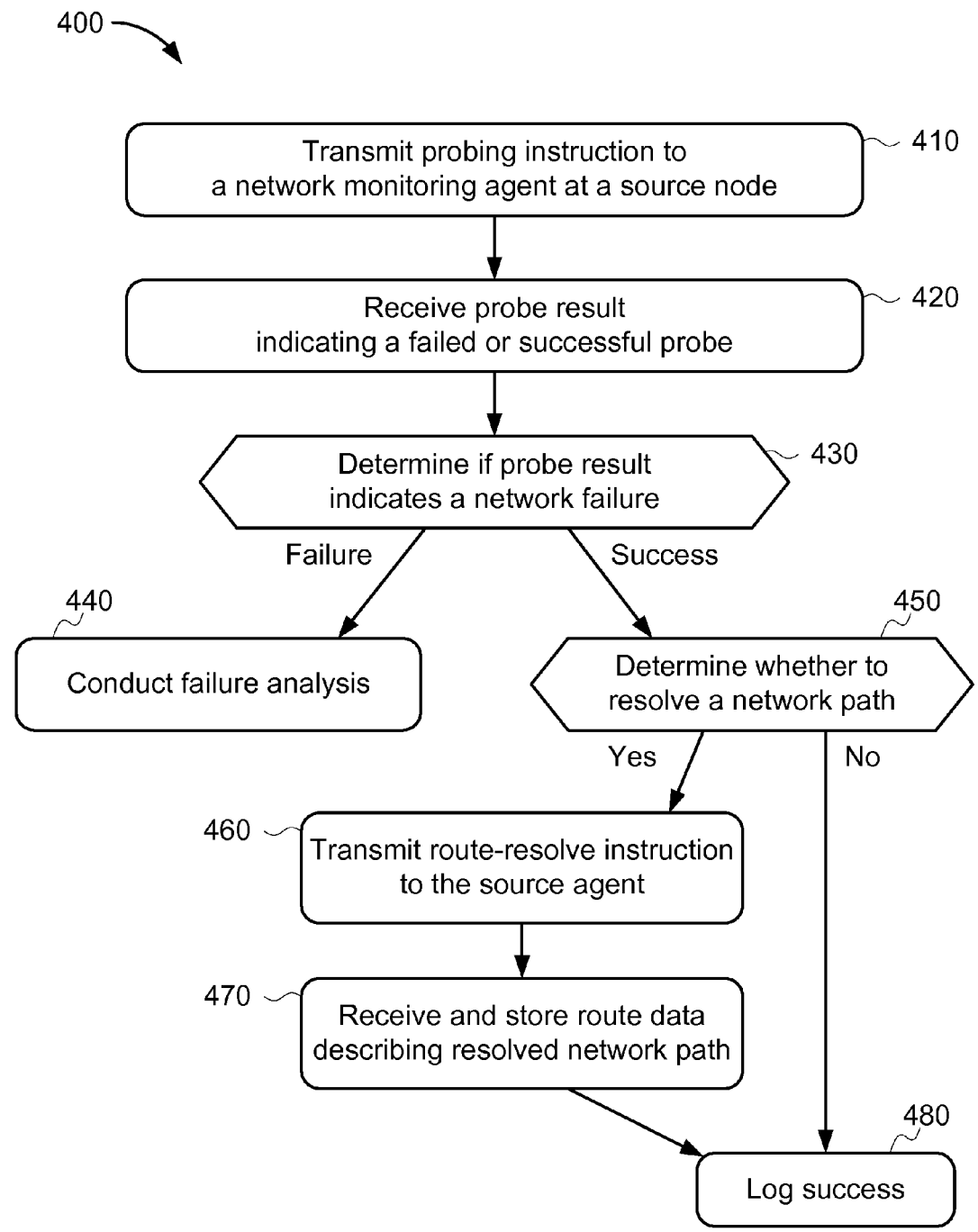
FIG. 4 is a flow diagram of an example method of periodically probing a network by a zone probing controller, according to an illustrative implementation.

The fault detection module 302 periodically requests zone controllers 304 to collect network status information. As shown in FIG. 4, the zone controller 304 will transmit a probing instruction to a source agent 306 and determine if the probe indicates a network failure. When the probe is successful, that is, when there is no failure, the zone controller 304 may determine to resolve a network path associated with the successful probe. The fault detection collects route data descriptive of these network paths and stores the route data in the database 312. Because network paths are naturally temporary, the value of the route data atrophies over time. In some implementations, route data older than a threshold (e.g., two weeks) is discarded or purged as stale. In some implementations, route data is assigned a reliability score that is a function of the data's age. E.g., a newly stored route is more reliable than an older route. In some implementations, if the route data corresponding to a network path between a particular pair of nodes is older than some threshold (e.g., one to two weeks), the route resolver 314 may request a new probe between the pair of nodes and, if the probe is successful, may request new route data for a corresponding network path between the pair of nodes. In some implementations, if a probe is successful, then a decision is made randomly whether or not to resolve a network path corresponding to the successful probe. For example, in some implementations, a small percentage of successful probes are automatically resolved. The small percentage may be as little as 2%, 1%, 0.5%, 0.01%, or even smaller. In some implementations, the determination to randomly resolve a network path corresponding to a successful probe is made at the monitoring agent 306. In some implementations, the determination is made at the probe controller 304. In some implementations, the determination is made at the fault detection module 302.

The collected route data is stored in the database 312. The analysis module 316 processes the route information to identify, for any particular intermediary node in the network, a pair of host nodes with a corresponding network path through the particular intermediary node. With enough route data, the analysis module 316 can identify routes expected to pass through each network interface on a particular intermediary node.

Figures 3B, 3C:
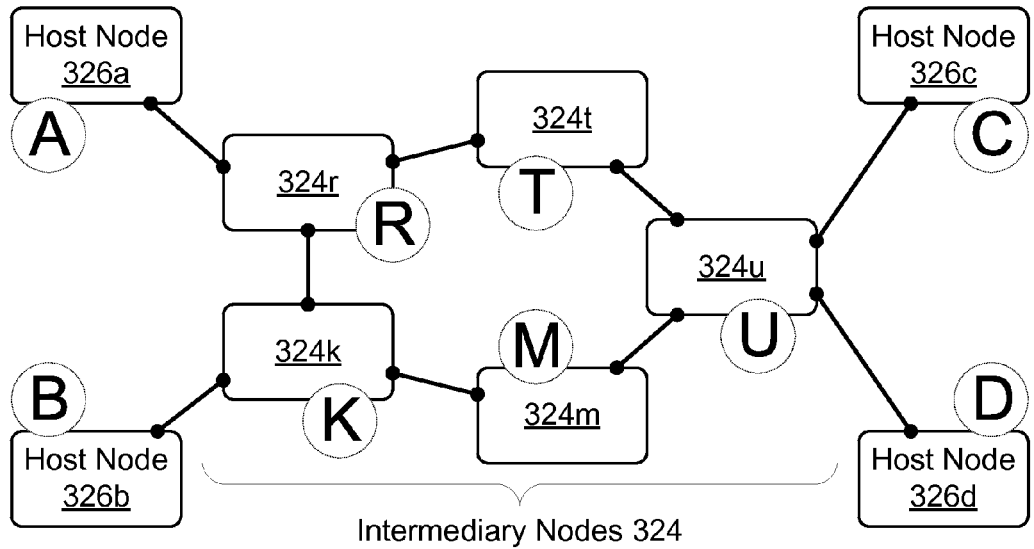
FIG. 3B is a schematic diagram of an example set of host nodes and intermediary nodes in a portion of the network illustrated in FIG. 3A.
FIG. 3C is a table of route data for the example set of host nodes and intermediary nodes illustrated in FIG. 3B.

FIGS. 3B and 3C illustrate a set of example nodes in an example network, along with route data for network paths through the various ports of the example nodes. Host nodes 326a-326d are shown in FIG. 3B connected to each other via a network of intermediary nodes 324. Each of the host nodes 326a-326d hosts a network monitoring agent 306, and each host of the host nodes 326a-326d is labeled, for purposes of this example, as A, B, C, or D. Each of the intermediary nodes 324 do not host a network monitoring agent 306, and are labeled, for purposes of this example, as R, T, K, M, or U. A network path from host node A (326a) to host node D (326d) may pass through intermediary nodes R, T, and U (intermediary nodes 324r, 324t, and 324u). The fault detection module 302 discovers each of the routes through the intermediary nodes 324 by collecting probe and route data from the source agents 306 at the host nodes 326a-326d. FIG. 4, described below, illustrates a method for collecting the probe and route data. FIG. 3C illustrates one example representation, table 370, of the collected route information for the example network shown in FIG. 3B.

Referring to FIGS. 3B and 3C in more detail, a network monitoring agent 306 may construct a partial path from a source node towards a destination node, but terminating at an intermediary node. The fault detection module 302 identifies the terminus intermediary node as a potential point of failure in the network. For example, a partial path from node B to node C may end at intermediary node K. The failure may be at node K or at a next-hop node subsequent to node K on a network path from the node B to node C, e.g., intermediary node R or intermediary node M. The failure could be, for example, that node M may be silently dropping packets at the interface connected to node K. The interface at node M connected to node K is shown in the table 370 as interface M(K) with ingress paths from host node B to host node C and from host node B to host node D, and with egress paths from host node C to host node B and from host node D to host node B. The fault detection module 302 can request tests along one or more of the known network paths through the suspect intermediary node K (324k) and its next-hop neighbors, intermediary node R (324r) and intermediary node M (324m) to isolate and identify the source of the problem. In some implementations, each network interface on the suspect node is tested using multiple paths. The results are then filtered or are otherwise processed to rule out failures that occur during normal operation. These false failures may resulting from, e.g., network noise or congestion. FIGS. 4-8 are flow diagrams illustrating various aspects of network testing processes in more detail.

As indicated above, FIG. 4 is a flow diagram for an example method 400 used to periodically probe a network by a zone probing controller 304. At regular or random intervals the zone probing controller 304 causes various network monitoring agents 306 within its network zone 310 to send probes through the network. In particular, for each network monitoring agent 306, the zone probing controller 304 transmits probing instructions to the monitoring agent at a source node ("source agent") (stage 410) and receives, in response, a probe result indicating a failed or successful probe (stage 420). The zone probing controller 304 then determines if the probe result indicates a network failure (stage 430). If the result indicates a failure, the zone probing controller 304 can then conduct failure analysis (stage 440) or leave the analysis for a later time. If the result indicates a success, then the zone probing controller 304 determines whether to resolve a network path corresponding to the successful probe (stage 450). If so, then the zone probing controller 304 transmits a route-resolve instruction to the source agent (stage 460) and, in response, receives route data describing the resolved network path, which is then stored (stage 470). The zone probing controller 304 then logs the success (stage 480), e.g., by sending a message to the fault detection module 302 to update the database 312. The stored route data and the log of successful probes forms a database with a view of likely routes through the network topology.

Referring to FIG. 4 in more detail, the zone probing controller 304 transmits probing instructions to a source agent (stage 410) and receives, in response, a probe result indicating a failed or successful probe (stage 420). The zone probing controller 304 is configured to generate probing instructions. In some implementations, a probing instruction is a tuple that includes: an identifier for the source node (e.g., a Source IP address), an identifier for the destination node (e.g., a destination IP address), and protocol parameters such as a port, protocol, and type of service (ToS). In some implementations, multiple probes between the same source and destination are sent with different protocol parameters. This can illuminate network failures that only occur, for example, when an intermediary device is accommodating a particular protocol or a particular type of service. Data packets associated with other protocols or requiring other ToS treatments might pass through without issue. In some implementations, the probing instructions include just a 3-tuple of [Source IP address, Destination IP address, and Destination Port]. In some implementations the probing instructions specify other parameters, e.g., whether the probe should be one-way or two-way, whether the agent should resolve the route, and/or whether the agent should make multiple attempts. In some implementations, the probing instructions include identifying information such as a sequence number or logical timestamp (e.g., a vector timestamp or Lamport number). The identifying information may then be echoed back with the result. In some implementations, the probing instructions include proof of authority and/or proof of authenticity.

The zone probing controller 304 generates the probing instructions according to a defined probing policy. The probing policy specifies rules or guidelines for selection of the values to include in the probing instruction. For example, a probing policy may specify tuple values are to be selected randomly throughout the zone or network. The probing policy may also indicate the frequency with which probing instructions should be generated and the number of instructions to generate. In some implementations, the probing policy may place other constraints on the generation of probes. For example, the probing policy may place limits on the spatial density of source IP addresses or destination IP addresses included in a given cycle of probes to prevent overloading a portion of the zone with an unduly large number of probes. The probing policy can also establish the number of attempts a network monitoring agent 306 should attempt to execute a probing instruction before considering the instruction to have failed. In such implementations, the threshold can be included as one of the parameters in the tuple that forms the instruction. A probing policy may be specific to each zone 310 or may be uniform for the whole network.

For each probing instruction, the zone probing controller 304 transmits the probing instruction to the monitoring agent 306 associated with the source node specified in the probing instruction (stage 410). For example, the zone probing controller 304 can place a remote procedure call to the monitoring agent 306 including the probing instruction. The frequency of transmission of probing instructions can vary and may depend on the scale of the network and desired coverage. For example in large scale networks, thousands or tens of thousands of probing instructions may be transmitted to network monitoring agents 306 per minute to achieve a desired probing coverage.

The zone probing controller 304 then receives, from the network monitoring agent responsive to the request, a probe result indicating a failed or successful probe (stage 420). In some implementations, the response can be received as a response to the remote procedure call including the instruction. In such cases, the response may be a binary value indicating success or failure. In some implementations, the notification of failure or success includes a copy of the instructions or identifies the probing instructions in any other suitable format. For example, the indication may include identifying information such as a sequence number or logical timestamp associated with the instruction.

The zone probing controller 304 determines if the probe result indicates a network failure (stage 430). In general, a probe that reaches its destination is a successful probe indicating an operational network path. However, a probe that does not reach its destination does not necessarily indicate a network failure. Packets may be dropped by a functional network for a variety of reasons including, for example, network congestion causing a buffer overflow. In some implementations, as described below in reference to FIG. 5, a monitoring agent resends failed probes up to a threshold number of resend attempts. In some implementations, the zone probing controller 304 tallies the number of probe attempts and determines if the number exceeds a threshold, e.g., five or more failed attempts within a five minute window. If the number of probe attempts exceeds the threshold, then the probe result indicates a network failure.

In some implementations, if the result indicates a failure, the zone probing controller 304 conducts failure analysis (stage 440). For example, as described below in reference to FIG. 6 and FIG. 7, in some implementations, the fault detection module 302 identifies a set of potentially failed intermediary nodes and, as described in reference to FIG. 8, uses the zone probing controller 304 to test a set of network paths through the potentially failed intermediary nodes. The analysis of the tests through the potentially failed intermediary nodes can identify the point of failure. In some implementations, the zone probing controller 304 collects information about the failure but does not actively pursue further analysis. In some implementations, the fault detection module 302 attempts to reproduce the failure by requesting additional probes along the same network path. In some implementations, a failure may be expected. For example, a failure may occur along a network path through an intermediary device that has already been identified as failed. In some implementations, a failure suspected to have occurred at an intermediary node recently targeted for failure analysis is ignored as a known failure. In some implementations, each failure detected is assigned a priority value, and only high priority failures are explored further. In some implementations, the priority value is based on whether the failure has been recently investigated, and if so, how long ago. For example, if the suspected failed intermediary node was analyzed within a recent period of time (e.g., within the last one or two hours) then it is a low priority, whereas if it has not been explored within a recent period of time then it is a higher priority.

If the result indicates a success, then the zone probing controller 304 determines whether to resolve a network path corresponding to the successful probe (stage 450). In some implementations, a route is resolved for every successful probe. In some implementations, a route is only resolved for a successful probe if previously stored route data corresponding to the probe is unreliable, e.g., older than a threshold length of time such as two weeks. In some implementations, the determination whether to resolve a particular network path is random. The determination may be made such that routes are resolved for only a small percentage of successful probes selected at random. The percentage may be as little as 2%, 1%, 0.5%, 0.01%, or even smaller.

If the zone probing controller 304 determines to resolve a network path corresponding to the successful probe, then the zone probing controller 304 transmits a route-resolve instruction to the source agent (stage 460) and, in response, receives route data describing the resolved network path, which is then stored (stage 470). In some implementations, the instruction specifies a traceroute request to the same destination as the probe. In some implementations the zone probing controller 304 also instructs the destination node to perform a traceroute back towards the source node. The resulting route data from the traceroutes identifies a sequence of intermediary nodes forming a network path between the source node and destination node.

The zone probing controller 304 then logs the success (stage 480), e.g., by sending a message to the fault detection module 302 to update the database 312.

In some implementations, upon receiving indications of probing instructions that resulted in failed transmissions or successful transmissions, the zone probing controller 304 transmits the information to a database 312 in the fault detection module 302. In some implementations, the zone probing controller 304 transmits the indications of probing instructions that resulted in failed transmissions or successful transmissions directly to the database 312 included in the fault detection module 302. In some implementations, each indication is transmitted by the zone probing controller 304, as it is received, one at a time to minimize the amount of time between receipt of an indication by the zone probing controller 304 and route resolving by the fault detection module 302. In some implementations, the indications are communicated to the fault detection module 302 in bulk according to a fixed schedule or upon receipt of a threshold number of failure notifications. In some implementations, indications are sent with time-stamps or additional information.

Figure 5:
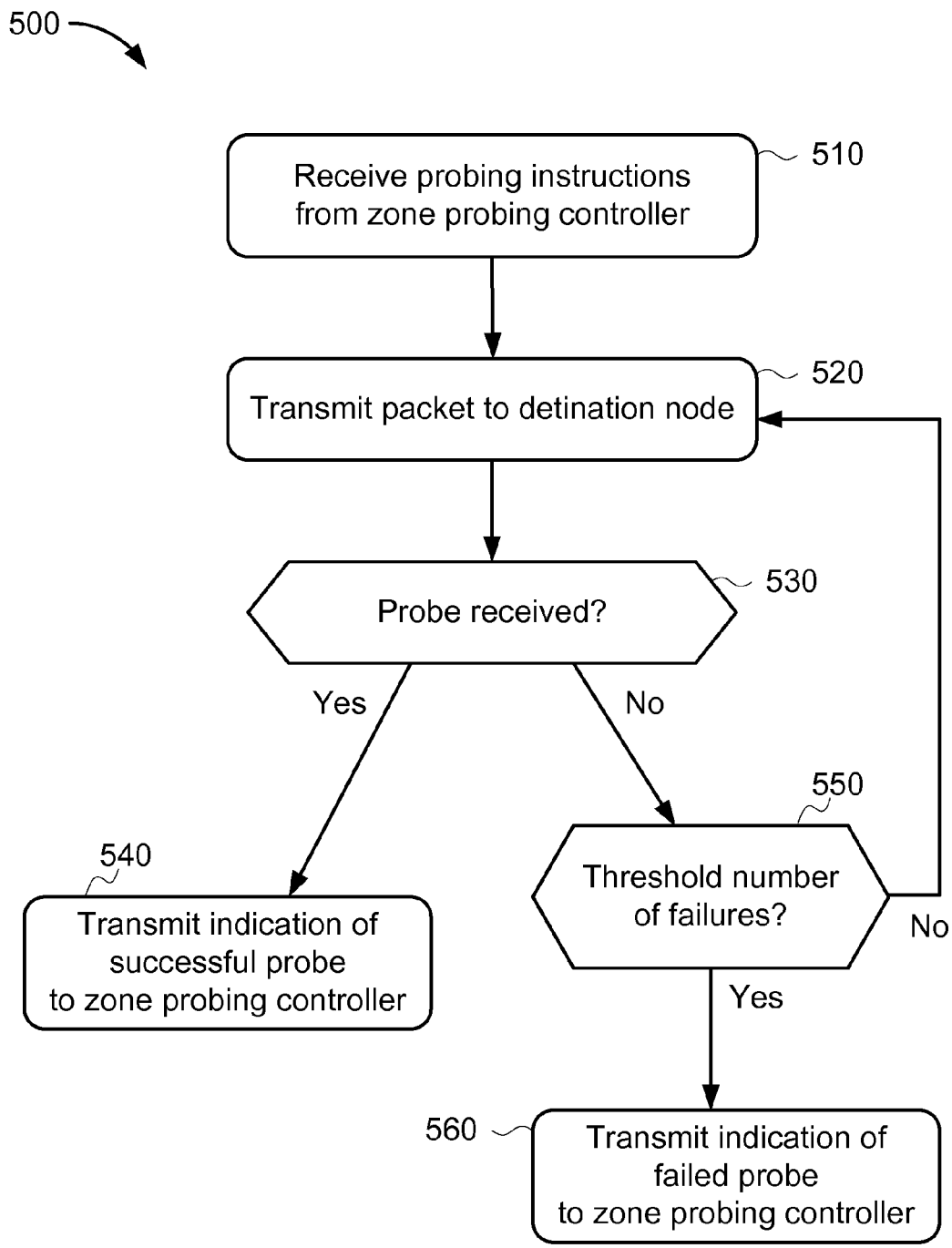
FIG. 5 is a flow diagram of an example method performed by a monitoring agent, according to an illustrative implementation.

FIG. 5 is a flow diagram depicting the functionality of network monitoring agents 306 in some implementations. As illustrated, in some implementations, each network monitoring agent 306 receives probing instructions from a zone probing controller 304 (stage 510) and transmits a two-way probe to the specified destination node (stage 520). The monitoring agent 306 waits for a response to be received from the destination node (stage 530). If a response is received from the destination node, the monitoring agent 306 transmits an indication of such to the zone probing controller 304 (stage 540). If a response is not received the monitoring agent 306 again transmits the probe to the destination node (stage 520) and repeats the transmission until a threshold number of failures has been reached (stage 550). When the threshold number of failures has been reached, the monitoring agent 306 transmits the indication of such to the zone probing controller 304 (stage 560).

Referring to FIG. 5, in more detail, a network monitoring agent 306 receives probing instructions from a respective zone probing controller 304 (stage 510). The probing instructions received by the network monitoring agent 306 include a tuple specifying a source node and a destination node as well as other probe parameters. As indicated above, each monitoring agent 306 is associated with a node. The monitoring agent 306 associated with the source node specified in the probing instruction receives the probing instruction from the zone probing controller 304.

Upon receiving a probing instruction, a monitoring agent 306 and transmits a probe to the destination node specified in the probing instruction (stage 520). The probe is a data packet that prompts a response to be sent from the destination node to the source node upon receipt of the data packet by the destination node indicating success of the transmission. For example, the data packet sent by the network monitoring agent 306 can be a TCP SYN packet. A response containing SYN-ACK or RST would indicate success of the transmission. A lack of response indicates failure of the particular transmission. The failure may be on either the send path or on a return path.

After the network monitoring agent 306 transmits the data packet, it waits for a response for a threshold amount of time (stage 530). If the monitoring agent 306 receives a response from the destination node, the transmission is deemed successful and the zone probing controller 304 is informed accordingly (stage 540). Once a threshold amount of time has passed from sending the data packet without a response received by the monitoring agent 306 from the destination node, the monitoring agent 306 transmits another probe to the same destination (stage 520) and again waits for a response. The threshold amount of time can vary. For example the threshold amount of time for the monitoring agent 306 to wait for a response may be milliseconds, microseconds or seconds.

The network monitoring agent 306 continues to send the probe, then wait for a threshold amount of time, until a threshold number of attempts is reached (stage 550). The threshold number of attempt can also vary. In some implementations, the threshold number of failed transmissions could be five and the monitoring agent 306 would attempt transmission of the probe five times, each time waiting for the threshold amount of time. In other implementations, the threshold number can be between 3 and 10. Once a threshold number of attempts is reached without the monitoring agent 306 receiving a response from the destination node, the transmission is deemed failed and the zone probing controller 304 is informed by the monitoring agent 306 of the failure (stage 560). The indication of success or failure of a probe can be provided by providing copies of the instructions or in any other suitable format. For example, the indication may be in the form of a response to the remote procedure call, where the response is a "1" or a "0," "1" indicating success and "0" indicating failure (or vice versa). The indication of success or failure of the probe may include a time stamp or any additional data.

Figure 6:
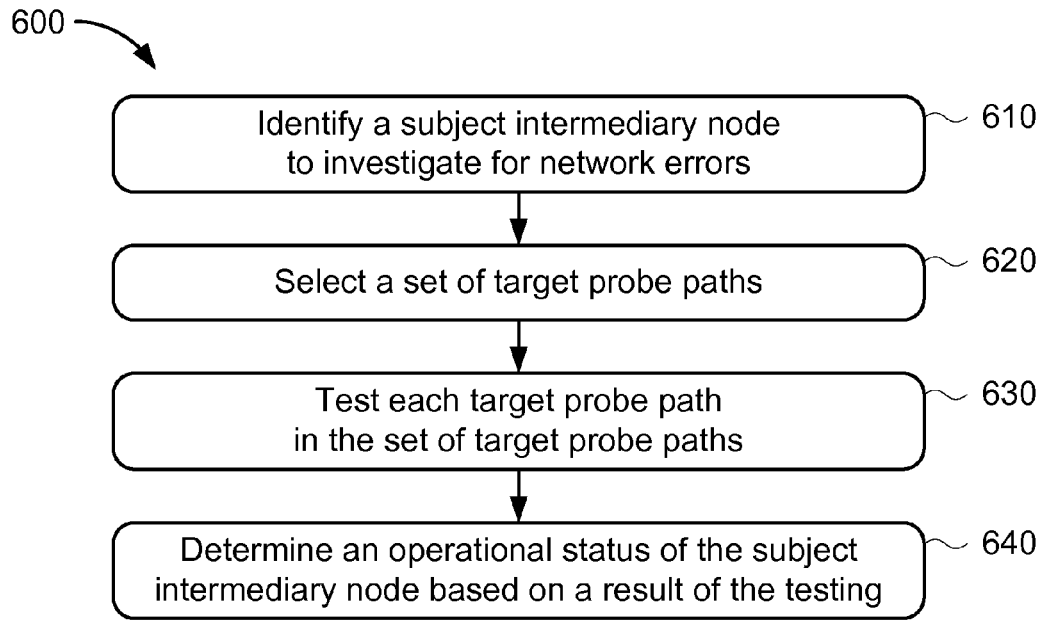
FIG. 6 is a flow diagram of an example method for investigating an intermediary node for failure, according to an illustrative implementation.

FIG. 6 is a flowchart diagram of a method 600 for investigating an intermediary node for failure. In broad overview, a fault detection module 302 identifies a subject intermediary node to investigate for network errors (stage 610) and selects a set of target probe paths (stage 620). The fault detection module 302 then causes the zone probing controller 304 to test each target probe path in the set of target probe paths (stage 630) and uses the results to determine an operational status of the subject intermediary node (stage 640).

The method 600 can be initiated for any appropriate reason. For example, in some implementations, the method 600 is initiated when a network failure is detected by a probe, e.g., as described in reference to FIG. 4. In some implementations, the method 600 is initiated at regular intervals for randomly selected subject intermediary nodes. In some implementations, the method 600 is initiated at regular intervals for specific subject intermediary nodes. For example, in some implementations, the fault detection module 302 maintains an ordered watch list of intermediary nodes to monitor closely. The fault detection module 302 then targets each node on the watch list at regular intervals. Nodes may be added or removed from the watch list. In some implementations, intermediary nodes are added to the watch list if they have failed and been subsequently repaired or if they have failed intermittently, where the failure has not been reliably reproduced. In some implementations an external event can trigger the method 600. For example, an internal counter of failures may exceed a threshold, an external system may report an error, an administrator may request targeting, or some other failure (e.g., an application error) may call for initiating the method 600 to investigate an intermediary node for failure.

Referring to FIG. 6 in more detail, the method 600 begins with a fault detection module 302 identifying a subject intermediary node to investigate for network errors (stage 610). In some implementations, the subject intermediary node is the last responsive intermediary node on a partial path from a source host node towards a destination host node, e.g., discovered during a routine probe. A trace route from the source host node towards the destination host node subsequent to a failed probe will identify a partial path ending with a last-responsive intermediary node. It is likely that the failure is either with the subject intermediary node or with an immediate next-hop node. The route data acquired by the method 400, illustrated in FIG. 4, stored in the database 312 can be used to identify a likely next hop, e.g., as shown in the table 370 illustrated in FIG. 3C. In some implementations, the likely next hop is identified as the subject intermediary node at stage 610. In some implementations, an intermediary node is selected at random as the subject intermediary node, e.g., for random testing of a network.

The fault detection module 302 then selects a set of target probe paths (stage 620). The set of target probe paths is selected, at stage 620, to exercise each network interface of the subject intermediary node, and to test "next-hop" intermediary nodes connected to the subject intermediary node. A method of selecting the set of target probe paths is described in reference to FIG. 7. In some implementations, if the subject intermediary node is identified as a top-of-rack (ToR) switch, the set of target probe paths is selected as a path between each host node under the ToR switch and one or more randomly selected host nodes under the ToR switch. For example, the set of target probe paths can be from each host node to three other host nodes randomly selected for each source host node.

The fault detection module 302 then causes the zone probing controller 304 to test each target probe path in the set of target probe paths (stage 630). A source host node for each probe path is caused to transmit a probe to a corresponding destination host node for the target probe path. In some implementations, the source host node also resolves a network path towards the corresponding destination host node to verify that a particular target intermediary node is actually in the path. In some implementations, the source host node resolves the network path only when the probe successfully reaches the destination node. In some implementations, the source host node does not send a probe, and only attempts to resolve the network path (where a successful path determination is consistent with a successful probe and an incomplete path determination indicates a failed probe). Methods of testing a test path from a source node to a destination node through a target intermediary node are described in more detail below, in reference to FIG. 8.

The fault detection module 302 determines an operational status of the subject intermediary node based on a result of the testing (stage 640). If each of the tests through a particular subject intermediary node are successful, the node is operational. If some of the tests fail, the nature of the failures can be used to determine the operational status in more detail. For example, if none of the tests successfully traverse the subject intermediary node, then it is in a failed state. If tests through the subject intermediary node are generally successful, except for test paths through the subject intermediary node and a particular next-hop node, then the failure may be with the next-hop node. If tests of the particular next-hop node are likewise successful, except for test paths through the subject intermediary node, than the failure is in the link between the two nodes. Thus the results of the tests indicate the operational status of the subject intermediary node.

Figure 7:
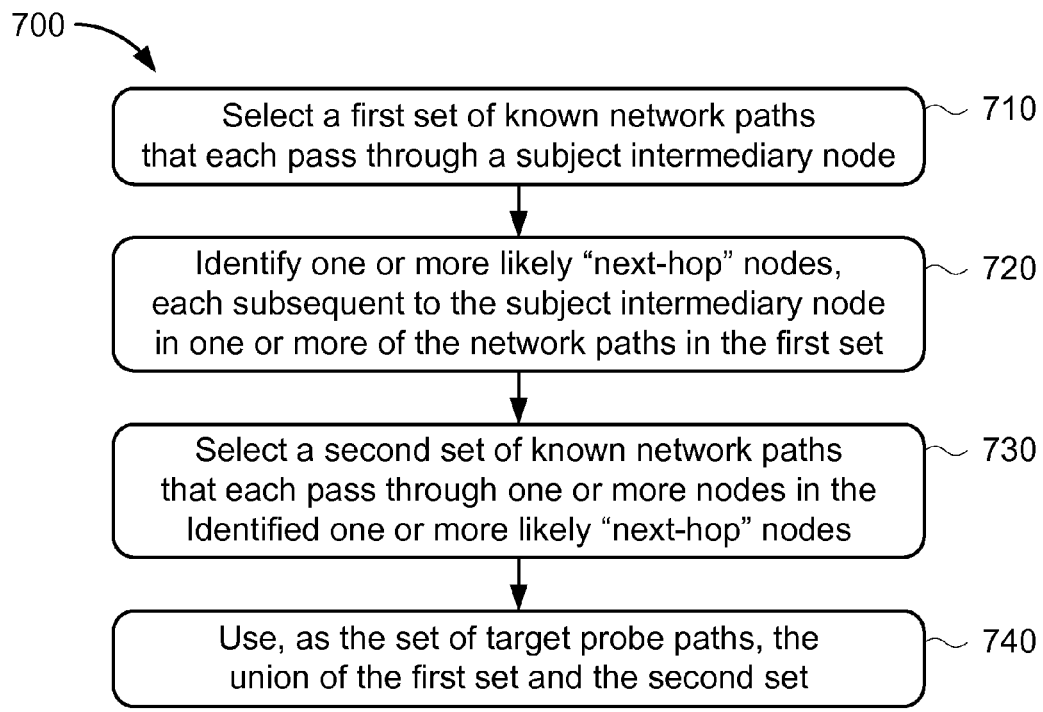
FIG. 7 is a flow diagram of an example method for selecting a set of target probes for investigation of a subject intermediary node, according to an illustrative implementation.

FIG. 7 is a flowchart diagram of a method 700 for selecting a set of target probes for investigation of a subject intermediary node. In broad overview, a fault detection module 302 uses a database 312 of known network paths to select a first set of known network paths that each pass through the subject intermediary node (stage 710). The fault detection module 302 identifies one or more likely "next-hop" nodes, each subsequent to the subject intermediary node in one or more of the network paths in the first set (stage 720). Then the fault detection module 302 uses the database 312 of known network paths to select a second set of known network paths that each pass through one or more nodes in the identified set of likely "next-hop" nodes (stage 730). The paths in the second set can, but are not required to, pass through the subject intermediary node. The fault detection module 302 uses the union of the first set of network paths selected in stage 710 and the second set of network paths selected in stage 730 as the set of target probe paths (stage 740).

Referring to FIG. 7 in more detail, the fault detection module 302 uses the database 312 of known network paths to select a first set of known network paths that each pass through the subject intermediary node (stage 710). A network path passes through a subject intermediary node if the subject intermediary node is part of a sequence of intermediary nodes forming a network path connecting a pair of host nodes. The database 312 contains route data for network paths between various pairs of host nodes. In some implementations, the route data in the database 312 is gathered and maintained using the method 400 shown in FIG. 4. In some implementations, the fault detection module 302 explores the network with random probes and collects route data describing network paths between randomly selected host nodes. In some implementations, selecting a network path from the database 312 consists of selecting a pair of host nodes where it is expected, based on prior network exploration, that network traffic from one host node of the pair to the other host node of the pair will pass through the subject intermediary node. However, it is possible that some explored network paths are not accurate, i.e., that a path stored in the database is no longer used in the network. Thus, while the network paths selected in stage 710 are expected to pass through the subject intermediary node, some might not. The route data may be refreshed from time to time. In some implementations, any representation of a network path that has not been probed for more than a threshold period of time (e.g., two weeks) is removed from the database. In some implementations, only a sub-set of known network paths passing through the subject intermediary node are selected for the first set in stage 710. For example, in some implementations, only the most reliable paths (e.g., the most recently explored) are used. In some implementations, identified paths are sorted by a reliability score and only the highest scoring paths are used (up to a predetermined number or percentage). The reliability score can be based on the age of the data entries, on the durability of the entries (i.e., if a path has been retained or refreshed repeatedly, demonstrating persistence), and/or on other attributes of the path explored such as the number of intermediary devices in the path or the number of intermediary devices in the path not already covered (enough) by other stored paths. In some implementations, each intermediary node is covered by at least a threshold number (e.g., one hundred) of different paths stored in the database 312. An older path may be retained in order to keep the number of paths stored above this threshold.

The fault detection module 302 then identifies a set of one or more likely "next-hop" nodes, each subsequent to the subject intermediary node in one or more of the network paths in the first set (stage 720). Each network interface in use on the subject intermediary node is connected to another network node. The fault detection module 302 identifies each of these connected network nodes such that a test probe can be sent through each network interface. Further, it is possible that a network error implicating the subject intermediary node is actually caused by another network node connected to the subject intermediary node, i.e., a "next-hop" node. The "next-hop" nodes are identified from the previously discovered network data in the database 312. However, as the network paths may change over time, the fault detection module 302 may identify "next-hop" nodes that are no longer connected to the subject intermediary device or are no longer in use in the paths represented in the database 312.

The fault detection module 302 uses the database 312 of known network paths to select a second set of known network paths that each pass through one or more nodes in the identified set of likely "next-hop" nodes (stage 730). The paths in the second set can, but are not required to, pass through the subject intermediary node. Like the first set of network paths, the second set of network paths are based on route data stored in the database 312. Selection of the second set of network paths is performed in the same manner as selection of the first set, where the only difference is that network path is expected to include one of the "next-hop" nodes. As with the first set of network paths, not every possible path needs to be included.

The fault detection module 302 uses the union of the first set of network paths selected in stage 710 and the second set of network paths selected in stage 730 as the set of target probe paths (stage 740). Redundant network paths are omitted from the union. The network paths are represented as pairs of host nodes. In some implementations, the pairs are tested in both directions, where a first node in the pair acts as the source node for one test and as the destination for another test. In some implementations, the pairs are tested with two-way probes, where one of the two nodes in the pair of host nodes is randomly selected as the source node and the other is used as the destination node.

Figure 8:
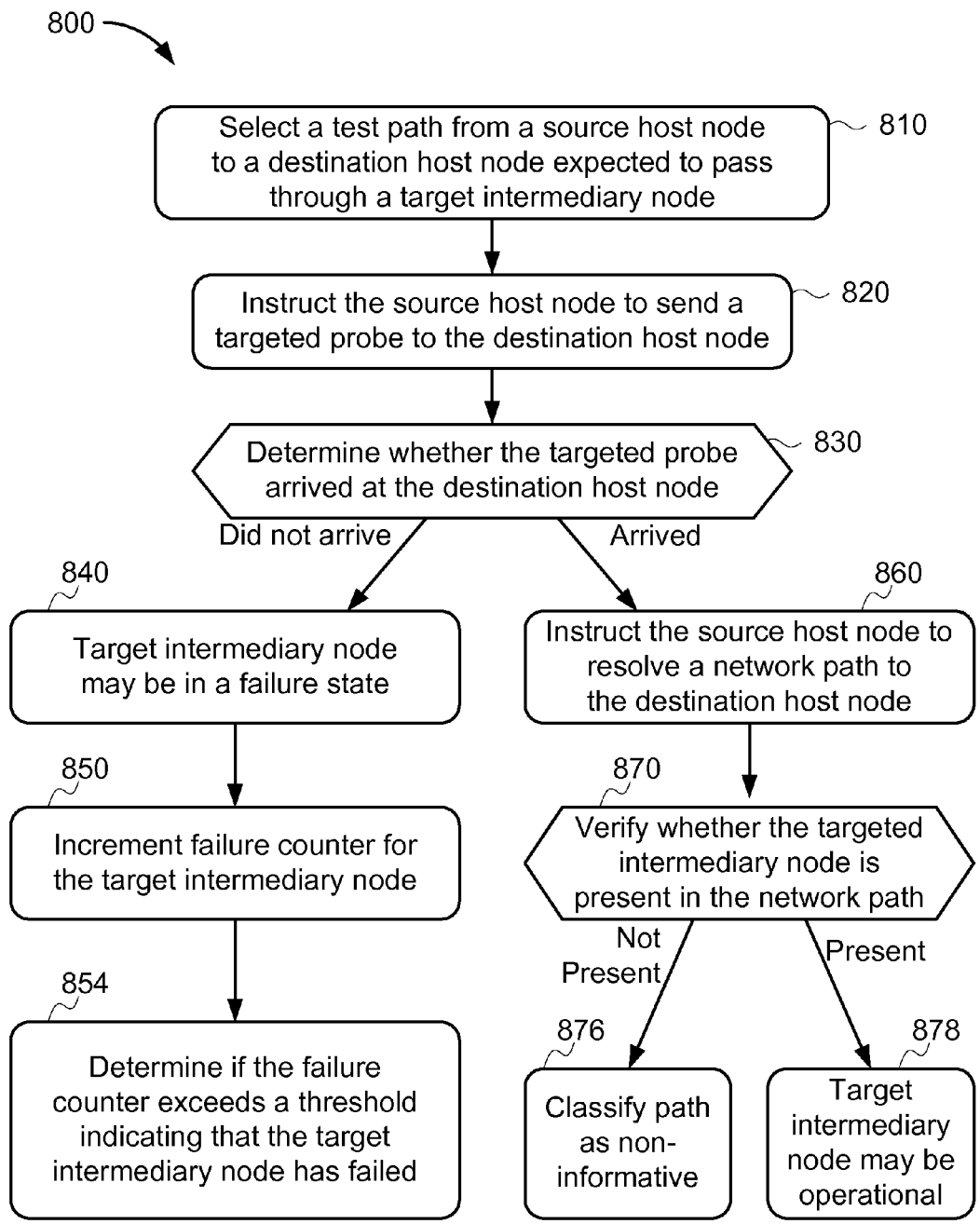
FIG. 8 is a flowchart diagram of a method for testing a path through a target intermediary node, according to an illustrative implementation.

FIG. 8 is a flowchart diagram of a method 800 for testing a path through a target intermediary node. The method 800 may be used, for example, to test a set of paths through the target intermediary node, e.g., as a testing session. In some implementations, there may be hundreds of paths tested through a target intermediary node during a single such session. In broad overview, the fault detection module 302 selects a test path from a set of network paths to test, e.g., the set of target probe paths selected by the method 700, and tests it via a probe controller 304. The fault detection module 302 selects the test path from a source host node to a destination host node, where the path is expected to pass through a target intermediary node (stage 810). The fault detection module 302 instructs the source host, via the probe controller 304, to send a targeted probe to the destination host node (stage 820). The fault detection module 302 determines whether the targeted probe arrived at the destination host node (stage 830). If the targeted probe did not arrive, the target intermediary node may be in a failure state (stage 840). The fault detection module 302 then performs further analysis of the target intermediary node, e.g., by incrementing a failure counter for the target intermediary node (stage 850) and determining if the failure counter now exceeds a threshold indicating that the target intermediary node has failed (stage 854). If the targeted probe did arrive, the fault detection module 302 instructs the source host, via the probe controller 304, to resolve the route between the source host node and the destination host node, e.g., by performing a traceroute (stage 860). The fault detection module 302 then verifies whether the targeted intermediary node is present in the resolved network path (stage 870). If the targeted intermediary node is not present, the network path is not useful for testing the target intermediary node and the path is classified as non-informative (stage 876). If the targeted intermediary node is present in the resolved network path, then it appears operational along that path (stage 878). The fault detection module 302 tests a variety of test paths using the method 800 to collect information about the target intermediary nodes and analyzes this information to identify any failed nodes. An intermediary node may appear operational according to a probe along a first path (as in stage 878), but if enough other probes through the intermediary node fail (e.g., as counted in stage 850) then the node will be considered to be in a failed state.

Referring to FIG. 8 in more detail, the method 800 begins with the fault detection module 302 selecting the test path from a source host node to a destination host node, where the path is expected to pass through a target intermediary node (stage 810). The target intermediary node may be the subject intermediary node identified at stage 610 in the method 600 illustrated in FIG. 6. For example, the target intermediary node may be a suspect intermediary node, e.g., the last responsive intermediary node on a partial path. The target intermediary node may be a "next-hop" neighbor of the subject intermediary node. In some implementations, the fault detection module 302 selects the test path from the set of test paths assembled in the method 700 shown in FIG. 7.

Still referring to FIG. 8, the fault detection module 302 instructs the source host, via the probe controller 304, to send a targeted probe to the destination host node (stage 820). In some implementations, the targeted probe is a one-way probe, where the destination reports receipt of the probe to the probe controller 304. In some implementations, the targeted probe is a two-way probe, sent, e.g., using the method 500 shown in FIG. 5. In some implementations, the probe controller 304 sends traceroute packets as the targeted probe at stage 820.

The fault detection module 302 determines whether the targeted probe arrived at the destination host node (stage 830). In some implementations, a network monitoring agent 306 at the destination host node reports receipt of the targeted probe to the zone probing controller 304, which notifies the fault detection module 302. In some implementations, where the targeted probe is a two-way probe, the monitoring agent 306 at the source host node reports receipt of a confirmation message to the zone probing controller 304, which notifies the fault detection module 302. In some implementations, the zone probing controller 304 includes a fault detection module 302.

If the targeted probe did not arrive, the target intermediary node may be in a failure state (stage 840). If the targeted probe did arrive, the fault detection module 302 instructs the source host, via the probe controller 304, to resolve the route between the source host node (stage 860), e.g., in order to verify that the target intermediary node is still part of the network path between the source node and the destination node. In some implementations, the probe controller 304 reports the arrival status of the targeted probe to the fault detection module 302.

If the targeted probe did not arrive, the target intermediary node may be in a failure state (stage 840). The fault detection module 302 then performs further analysis of the target intermediary node, e.g., by incrementing a failure counter for the target intermediary node (stage 850) and determining if the failure counter now exceeds a threshold indicating that the target intermediary node has failed (stage 854). In some implementations, the fault detection module 302 instructs, via the probe controller 304, the source host node to resolve the network path (e.g., to perform a traceroute) from the source host towards the destination host node. The network path is expected to be a partial path because the targeted probe failed to arrive at the destination host node. The fault detection module 302 the verifies whether the targeted intermediary node is present in the operational portion of the resolved partial network path. If the targeted intermediary node is not present, it may be in a failed state. The analysis of other network paths is used to confirm. If the targeted intermediary node is present in the partial path, it may be operational. For example, if the targeted intermediary node is not the last responsive node on the partial path, then it is likely to be operational along the respective path. If the targeted intermediary node is the last responsive node on the partial path, it may be in a failure state. The analysis of other network paths is used to confirm.

In some implementations, when a probe through a target intermediary node fails, the fault detection module 302 increments a failure counter for the target intermediary node (stage 850). In some implementations, there is one counter for each target intermediary node. In some implementations, a separate failure counter is maintained for each interface of the target intermediary node. If a failed probe was expected to pass through a specific interface, the corresponding failure counter for that specific interface is incremented. In some implementations, the failure counter (or counters) is persisted in the database 312 in association with the target intermediary node. The counter may be removed or reset after a set period of time. In some implementations, each failure counter exists only for a probing "session" during which the target intermediary node is under analysis. In some implementations, the counter is a ratio of failures and probe attempts.

The fault detection module 302 determines if the incremented failure counter for a targeted intermediary node exceeds a threshold indicating that the target intermediary node has failed (stage 854). In some implementations the threshold is a percentage of the probe attempts through the targeted intermediary node. For example, in some implementations, an intermediary node is considered to have failed if more than 90% of probes through it have failed. In some implementations, the threshold is a fixed number of failed probes, e.g., 90 failed probes. In some implementations, the fixed number of probes is adjusted based on the number of possible probes. If the measured number of failed probes exceeds the designated threshold, the target intermediary node is deemed to have failed.

If, in stage 830, the fault detection module 302 determines that the targeted probe arrived at the destination host node, the fault detection module 302 instructs the source host, via the probe controller 304, to resolve the route between the source host node and the destination host node, e.g., by performing a traceroute (stage 860). The fault detection module 302 then verifies whether the targeted intermediary node is present in the resolved network pat (stage 870). If the targeted intermediary node is not present, the network path is not useful for testing the target intermediary node and the path is classified as non-informative (stage 876). If the targeted intermediary node is present in the resolved network path, then it appears operational along that path (stage 878). An intermediary node may be in a failure state but partially operational. In some implementations, a counter is updated to reflect the successful probe through the target intermediary node. In some implementations, there are two counters for a target intermediary node—a counter of failed probes and a counter of successful probes. The counters are not changed if the successful probe did not actually go through the intermediary node.

The implementations of a fault detection system described herein are discussed in terms of nodes, where each node could be a switch, router, other forwarding device within a network or one of a plurality of ports located thereon. In some implementations, the fault detection system disclosed herein can be employed to analyze individual network interfaces located on devices in a network or individual internal modules inside the device. In such implementations, instead of nodes, specific interfaces or specific internal modules associated with nodes may be considered by the fault detection system.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The terms "computer" or "processor" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system for locating network errors, the system comprising:
   a plurality of host nodes participating in a network of host nodes and intermediary nodes, wherein each host node in the plurality of host nodes includes a respective processor executing an instance of a network monitoring agent;
   a database storing route-data in computer-readable memory, the route-data representing, for each of a plurality of host node pairs, a set of intermediary nodes in a respective network path between the host nodes of the respective host node pair; and
   a controller in communication with the plurality of host nodes, the controller configured to:
      identify a subject intermediary node to investigate for network errors;
      select, using the route-data stored in the database, a set of target probe paths, where each target probe path includes a respective pair of host nodes separated by a network path that includes at least one target intermediary node, and where the at least one target intermediary node is either the subject intermediary node or an intermediary node that is a next-hop neighbor of the subject intermediary node, wherein the controller is configured to select the set of target probe paths by:
         selecting a first set of one or more pairs of first and second host nodes in the plurality of host nodes, wherein, for each pair of host nodes in the first set, there exists in the database route-data for a network path between the respective pair of host nodes through the subject intermediary node,
         identifying, from the route-data for the selected first set of host node pairs, one or more subject-neighbor intermediary nodes that are each a next-hop from the subject intermediary node in one or more of the network paths between the respective pairs of host nodes,
         selecting a second set of one or more pairs of first and second host nodes in the plurality of host nodes, wherein, for each pair of host nodes in the second set, there exists in the database route-data for a network path between the respective pair of host nodes through at least one subject-neighbor intermediary node, and
         using the union of the first set and the second set as the set of target probe paths;
      test each target probe path in the set of target probe paths, wherein testing a subject target probe path includes instructing a source host node of the subject target probe path, in the set of target probe paths, to send a targeted probe to a destination host node of the subject target probe path, and determining whether the targeted probe arrived at the destination host node; and
      determine, based on a result of the testing, an operational status of the subject intermediary node, wherein the determined operational status of the subject intermediary node comprises a failure status.

2. The system of claim 1, wherein the determined operational status identifies a failed port on the subject intermediary node.

3. The system of claim 1, wherein the controller is configured to identify one or more next-hop neighbors of the subject intermediary node as additional intermediary nodes to investigate for network errors based on the result of the testing.

4. The system of claim 1, wherein the network monitoring agent is configured to:
   send a probe packet to another host node in the plurality of host nodes via the network;
   receive a probe packet from another host node in the plurality of host nodes, and report, responsive to receiving the probe packet, receipt of the probe packet to the another host node, to the controller, or to both the another host node and the controller; and
   resolve a network path towards a particular network node in the plurality of host nodes by sending a plurality of traceroute packets address to the particular network node, receiving result data from intermediary nodes on a network path responsive to one or more of the traceroute packets, and generating route-data representative of the network path based on the received result data.

5. The system of claim 1, wherein testing the subject target probe path includes, responsive to determining that the targeted probe arrived:
   instructing the source host node to resolve a network path to the destination host node;
   receiving, from the source host node, resolved route data descriptive of the network path;
   identifying, from the resolved route data, an updated network path for the subject target probe path; and
   determining, whether any of the at least one target intermediary nodes of the subject target probe path are in the updated network path.

6. The system of claim 5, wherein the controller is configured to determine, responsive to determining that the subject target intermediary node is present on the updated network path, that the operational status of the subject intermediary node is functional for the updated network path.

7. The system of claim 5, wherein the controller is configured to determine, responsive to determining that none of the at least one target intermediary nodes are present on the updated network path, that the subject target probe path does not contribute information for determining the operational status of the subject intermediary node.

8. The system of claim 5, wherein the controller is configured to update the database route-data based on the updated network path.

9. The system of claim 1, wherein the controller is configured to periodically:
   randomly select a first host node a from the plurality of host nodes;
   randomly select a second host node a from the plurality of host nodes;
   instruct the first node to send an exploratory probe to the second node; and
   determine whether the exploratory probe from the first node arrived at the second node.

10. The system of claim 9, wherein the controller is configured to:
    instruct, responsive to a determination that the exploratory probe did not arrive at the second node, the first node to resolve a network path to the second node; and
    identify, from the resolved network path to the second node, a last responsive intermediary node as the subject intermediary node to investigate for network errors.

11. The system of claim 9, wherein the controller is configured to:
    instruct, responsive to satisfaction of a throttle condition and a determination that the exploratory probe arrived at the second node, the first node to resolve a network path to the second node; and
    update the database route-data based on the resolved network path to the second node.

12. The system of claim 11, wherein the throttle condition restricts performance of the traceroute to the second node to less than a tenth of a percent of determinations that exploratory probes arrive at respective second nodes.

13. The system of claim 1, wherein the determined operational status identifies a failure of a link between the subject intermediary node and the next-hop neighbor of the subject intermediary node.

14. The system of claim 1, wherein the determined operational status identifies a software configuration error of the subject intermediary node.

15. A method of locating network errors, the method comprising:
    maintaining a database storing route-data in computer-readable memory, the route-data representing, for each of a plurality of host node pairs, a set of intermediary nodes in a respective network path between the host nodes of the respective host node pair in a network of host nodes and intermediary nodes, wherein each host node includes a respective processor executing an instance of a network monitoring agent;
    identifying a subject intermediary node to investigate for network errors;
    selecting, using route-data stored in the database, a set of target probe paths, where each target probe path includes a respective pair of host nodes separated by a network path that includes at least one target intermediary node, and where the at least one target intermediary node is either the subject intermediary node or an intermediary node that is a next-hop neighbor of the subject intermediary node, wherein selecting the set of target probe paths comprises:
        selecting a first set of one or more pairs of first and second host nodes in the plurality of host nodes, wherein, for each pair of host nodes in the first set, there exists in the database route-data for a network path between the respective pair of host nodes through the subject intermediary node,
        identifying, from the route-data for the selected first set of host node pairs, one or more subject-neighbor intermediary nodes that are each a next-hop from the subject intermediary node in one or more of the network paths between the respective pairs of host nodes,
        selecting a second set of one or more pairs of first and second host nodes in the plurality of host nodes, wherein, for each pair of host nodes in the second set, there exists in the database route-data for a network path between the respective pair of host nodes through at least one subject-neighbor intermediary node, and
        using the union of the first set and the second set as the set of target probe paths;
    testing each target probe path in the set of target probe paths by instructing a source host node of a subject target probe path, in the set of target probe paths, to send a targeted probe to a destination host node of the subject target probe path, and determining whether the targeted probe arrived at the destination host node; and determining, based on a result of the testing, an operational status of the subject intermediary node, wherein the determined operational status of the subject intermediary node comprises a failure status.

16. The method of claim 15, wherein the determined operational status identifies a failed port on the subject intermediary node.

17. The method of claim 15, wherein testing the subject target probe path includes, responsive to determining that the targeted probe arrived:
   instructing the source host node to resolve a network path to the destination host node;
   receiving, from the source host node, resolved route data descriptive of the network path;
   identifying, from the resolved route data, an updated network path for the subject target probe path; and
   determining, whether any of the at least one target intermediary nodes of the subject target probe path are in the updated network path.

18. The method of claim 17, comprising determining, responsive to determining that the subject target intermediary node is present on the updated network path, that the operational status of the subject intermediary node is functional for the updated network path.

19. The method of claim 17, comprising determining, responsive to determining that none of the at least one target intermediary nodes are present on the updated network path, that the subject target probe path does not contribute information for determining the operational status of the subject intermediary node.

20. The method of claim 19, comprising:
   instructing, responsive to a determination that the exploratory probe did not arrive at the second node, the first node to resolve a network path to the second node; and
   identify, from the resolved network path to the second node, a last responsive intermediary node as the subject intermediary node to investigate for network errors.

21. The method of claim 19, comprising:
   instructing, responsive to satisfaction of a throttle condition and a determination that the exploratory probe arrived at the second node, the first node to resolve a network path to the second node; and
   update the database route-data based on the resolved network path to the second node.

22. The method of claim 15, wherein maintaining the database includes periodically:
   randomly selecting a first host node a from the plurality of host nodes;
   randomly selecting a second host node a from the plurality of host nodes;
   instructing the first node to send an exploratory probe to the second node; and
   determining whether the exploratory probe from the first node arrived at the second node.

23. A non-transitory computer-readable medium storing instructions that, when executed by a computing processor, cause the computing processor to:
   maintain a database storing route-data in computer-readable memory, the route-data representing, for each of a plurality of host node pairs, a set of intermediary nodes in a respective network path between the host nodes of the respective host node pair in a network of host nodes and intermediary nodes, wherein each host node includes a respective processor executing an instance of a network monitoring agent;
   identify a subject intermediary node to investigate for network errors;
   select, using route-data stored in the database, a set of target probe paths, where each target probe path includes a respective pair of host nodes separated by a network path that includes at least one target intermediary node, and where the at least one target intermediary node is either the subject intermediary node or an intermediary node that is a next-hop neighbor of the subject intermediary node;
   test each target probe path in the set of target probe paths by instructing a source host node of a subject target probe path, in the set of target probe paths, to send a targeted probe to a destination host node of the subject target probe path, and determining whether the targeted probe arrived at the destination host node;
   determine, based on a result of the testing, an operational status of the subject intermediary node, wherein the determined operational status of the subject intermediary node comprises a failure status;
   periodically randomly select a first host node a from the plurality of host nodes;
   randomly select a second host node a from the plurality of host nodes;
   instruct the first node to send an exploratory probe to the second node;
   determine whether the exploratory probe from the first node arrived at the second node;
   instruct, responsive to a determination that the exploratory probe did not arrive at the second node, the first node to resolve a network path to the second node; and
   identify, from the resolved network path to the second node, a last responsive intermediary node as the subject intermediary node to investigate for network errors.

24. The computer-readable medium of claim 23, comprising instructions that, when executed by a computing processor, cause the computing processor to:
   test the subject target probe path includes, responsive to determining that the targeted probe arrived, by:
      instructing the source host node to resolve a network path to the destination host node;
      receiving, from the source host node, resolved route data descriptive of the network path;
      identifying, from the resolved route data, an updated network path for the subject target probe path; and
      determining, whether any of the at least one target intermediary nodes of the subject target probe path are in the updated network path.

* * * * *